United States Patent
Tsai et al.

(10) Patent No.: US 12,223,563 B2
(45) Date of Patent: Feb. 11, 2025

(54) SYSTEMS AND METHODS FOR DYNAMICALLY GENERATING ARTWORK BASED ON VEHICLE SENSOR DATA

(71) Applicant: Toyota Connected North America, Inc., Plano, TX (US)

(72) Inventors: David Tsai, Irvine, CA (US); Will Hargis, Celina, TX (US)

(73) Assignee: TOYOTA CONNECTED NORTH AMERICA, INC., Plano, TX (US)

( * ) Notice: Subject to any disclaimer, the term of this patent is extended or adjusted under 35 U.S.C. 154(b) by 122 days.

(21) Appl. No.: 17/935,717

(22) Filed: Sep. 27, 2022

(65) Prior Publication Data
US 2024/0104788 A1 Mar. 28, 2024

(51) Int. Cl.
*G06T 11/00* (2006.01)
*G07C 5/08* (2006.01)

(52) U.S. Cl.
CPC ............ *G06T 11/00* (2013.01); *G07C 5/0841* (2013.01)

(58) Field of Classification Search
CPC .............................. G06T 11/00; G07C 5/0841
See application file for complete search history.

(56) References Cited

U.S. PATENT DOCUMENTS

| | | | | |
|---|---|---|---|---|
| 5,269,687 A * | 12/1993 | Mott | ...................... | A63F 13/803 434/69 |
| 5,354,202 A * | 10/1994 | Moncrief | ................ | A63F 13/45 434/69 |
| 5,398,309 A * | 3/1995 | Atkins | .................... | G06T 11/00 345/634 |
| 6,480,117 B1 * | 11/2002 | Flick | .................... | B60R 25/2009 340/5.2 |
| 9,251,603 B1 * | 2/2016 | Kozko | .................... | G06T 15/20 |
| 9,472,161 B1 * | 10/2016 | Ho | .......................... | G06T 15/10 |
| 10,257,586 B1 * | 4/2019 | Mensh | ............. | H04N 21/47217 |
| 10,699,404 B1 * | 6/2020 | Nussbaum | ............... | G06T 7/50 |
| 10,818,042 B1 * | 10/2020 | Tang | ........................ | G06T 7/73 |
| 11,238,477 B1 * | 2/2022 | Koch | ................. | G06Q 30/0209 |
| 11,278,810 B1 * | 3/2022 | Sarria, Jr. | ............. | G06F 3/0482 |
| 11,461,774 B1 * | 10/2022 | Khan | .................... | H04L 9/3213 |
| 11,533,467 B2 * | 12/2022 | McNeil | ................ | H04N 13/302 |
| 2001/0045978 A1 * | 11/2001 | McConnell | ........... | A63F 13/213 446/454 |
| 2002/0032553 A1 * | 3/2002 | Simpson | ................. | A63F 13/25 703/8 |
| 2004/0224740 A1 * | 11/2004 | Ball | ........................ | A63F 13/35 463/6 |
| 2007/0156294 A1 * | 7/2007 | Tipping | ................. | G09B 23/06 701/1 |
| 2009/0141130 A1 * | 6/2009 | Ortiz | .................... | H04N 23/698 348/E7.085 |
| 2010/0145578 A1 * | 6/2010 | Baur | .................. | G09B 19/0038 463/58 |

(Continued)

*Primary Examiner* — Charles L Beard
(74) *Attorney, Agent, or Firm* — DINSMORE & SHOHL LLP (57) ABSTRACT

Systems and methods for dynamically generating artwork from vehicle sensor data are disclosed. In one embodiment, a method of generating an artwork includes receiving vehicle sensor data from a vehicle, inputting the vehicle sensor data into a trained model, and generating, by the trained model, the artwork based at least in part on the vehicle sensor data.

18 Claims, 4 Drawing Sheets

(56) References Cited

U.S. PATENT DOCUMENTS

| | | | |
|---|---|---|---|
| 2012/0089275 A1* | 4/2012 | Yao-Chang | A63H 30/04 701/2 |
| 2013/0307934 A1* | 11/2013 | Densham | G03B 31/00 348/46 |
| 2014/0331253 A1* | 11/2014 | Allen | H04N 21/2353 725/32 |
| 2016/0292865 A1* | 10/2016 | Floor | G06V 20/42 |
| 2017/0302970 A1* | 10/2017 | Dudko | H04W 4/029 |
| 2018/0001198 A1* | 1/2018 | Frappiea | A63F 13/2145 |
| 2018/0091847 A1* | 3/2018 | Wu | H04N 21/2383 |
| 2018/0182261 A1* | 6/2018 | Naouri | G09B 19/167 |
| 2018/0253869 A1* | 9/2018 | Yumer | G06T 11/60 |
| 2018/0322513 A1* | 11/2018 | Smith | G06F 16/24556 |
| 2018/0341812 A1* | 11/2018 | Floor | G06V 20/42 |
| 2019/0005043 A1* | 1/2019 | Hemani | G06F 16/374 |
| 2019/0009175 A1* | 1/2019 | Buxton | A63F 13/5255 |
| 2019/0043178 A1* | 2/2019 | Chen | G06T 5/40 |
| 2019/0311546 A1* | 10/2019 | Tay | G06T 7/521 |
| 2020/0043246 A1* | 2/2020 | Loar | G06T 15/005 |
| 2020/0074674 A1* | 3/2020 | Guo | G06V 20/54 |
| 2020/0128902 A1* | 4/2020 | Brown | A42B 3/30 |
| 2020/0184547 A1* | 6/2020 | Andon | G06Q 30/0209 |
| 2020/0193743 A1* | 6/2020 | Pratz | G07C 5/0808 |
| 2020/0242105 A1* | 7/2020 | Rich | H04L 67/02 |
| 2020/0242646 A1* | 7/2020 | Edwards | G06Q 30/0265 |
| 2020/0311698 A1* | 10/2020 | Gardner | G07C 5/008 |
| 2020/0353356 A1* | 11/2020 | Li | A63F 13/803 |
| 2020/0388073 A1* | 12/2020 | Mall | A63F 13/655 |
| 2021/0216798 A1* | 7/2021 | Littman | G06V 20/41 |
| 2021/0319129 A1* | 10/2021 | Dutta | G06F 16/7867 |
| 2021/0409489 A1* | 12/2021 | Speasl | H04L 63/123 |
| 2022/0075845 A1* | 3/2022 | Bowen | G06F 30/30 |
| 2022/0101578 A1* | 3/2022 | Bedi | G06T 11/00 |
| 2022/0122050 A1* | 4/2022 | Pacella | H04L 63/108 |
| 2022/0164933 A1* | 5/2022 | Parameswaran | G06T 5/50 |
| 2022/0188892 A1* | 6/2022 | Sanor | B33Y 50/02 |
| 2022/0189124 A1* | 6/2022 | Sanor | G06T 19/006 |
| 2022/0198779 A1* | 6/2022 | Saraee | G06F 16/9535 |
| 2022/0327225 A1* | 10/2022 | Lyren | H04S 1/007 |
| 2022/0355206 A1* | 11/2022 | Koch | G06F 21/10 |
| 2022/0358186 A1* | 11/2022 | Deuel | G06Q 40/04 |
| 2022/0366172 A1* | 11/2022 | Stumpf | B60W 60/00 |
| 2022/0374888 A1* | 11/2022 | Lackey | H04L 9/3213 |
| 2023/0004625 A1* | 1/2023 | Khan | G06F 21/10 |
| 2023/0024852 A1* | 1/2023 | Joao | H04N 21/2585 |
| 2023/0036724 A1* | 2/2023 | Khalfan | G06Q 20/3829 |
| 2023/0132804 A1* | 5/2023 | Chen | A63F 13/803 705/14.12 |
| 2023/0158409 A1* | 5/2023 | Gardner | A63F 13/352 463/6 |
| 2023/0162179 A1* | 5/2023 | Deng | G06Q 20/3823 705/64 |
| 2023/0166185 A1* | 6/2023 | Hiatt | A63F 13/44 463/1 |
| 2023/0215196 A1* | 7/2023 | Sakashita | G06V 10/82 382/104 |
| 2023/0246854 A1* | 8/2023 | Thorpe | H04L 9/50 713/189 |
| 2023/0285863 A1* | 9/2023 | Secondi | B60K 35/00 |
| 2023/0298312 A1* | 9/2023 | Saraee | G06N 3/045 382/157 |
| 2023/0315817 A1* | 10/2023 | Yallen | H04N 21/8358 345/473 |
| 2023/0326107 A1* | 10/2023 | Bosua | G06T 11/001 |
| 2023/0342441 A1* | 10/2023 | Ghannam | B60R 25/01 |
| 2023/0360300 A1* | 11/2023 | De Brouwer | G06Q 20/1235 |
| 2023/0385758 A1* | 11/2023 | Levy | G06K 19/0723 |
| 2024/0020901 A1* | 1/2024 | Fayette | G06V 40/168 |
| 2024/0045790 A1* | 2/2024 | Bussa | H04L 9/50 |
| 2024/0046324 A1* | 2/2024 | McKnew | G01C 21/343 |
| 2024/0061696 A1* | 2/2024 | Zatkin | G06F 9/45533 |
| 2024/0061917 A1* | 2/2024 | Wang | G06Q 10/0639 |
| 2024/0070725 A1* | 2/2024 | Aher | G06V 10/774 |
| 2024/0078763 A1* | 3/2024 | Hedman | G06T 19/006 |
| 2024/0086384 A1* | 3/2024 | Soon-Shiong | G06F 16/2255 |
| 2024/0127211 A1* | 4/2024 | Newton | G06Q 20/065 |
| 2024/0134942 A1* | 4/2024 | Khan | G06F 21/10 |
| 2024/0289906 A1* | 8/2024 | Williams | G06Q 20/3678 |

* cited by examiner

FIG. 1A

Max Speed: 123 MPH

Best Lap: 3:02:45

SYSTEMS AND METHODS FOR DYNAMICALLY GENERATING ARTWORK BASED ON VEHICLE SENSOR DATA

TECHNICAL FIELD

The present specification relates to digital artwork and, more particularly, to systems and methods that dynamically generate artwork based on vehicle sensor data.

BACKGROUND

Vehicle owners are passionate about their vehicles, particularly vehicle owners that enjoy performance and competitive driving. These vehicle owners may desire something to commemorate special moments while driving their vehicles, whether it is a driving at a bucket-list racetrack or beating a personal record at the track.

Accordingly, systems and methods for commemorating vehicle moments and performance may be desired.

SUMMARY

In one embodiment, a method of generating an artwork includes receiving vehicle sensor data from a vehicle, inputting the vehicle sensor data into a trained model, and generating, by the trained model, the artwork based at least in part on the vehicle sensor data.

In another embodiment, a system for generating an artwork includes one or more processors and a non-transitory computer-readable medium storing instructions that, when executed by the one or more processors, cause the one or more processors to receive vehicle sensor data from a vehicle, input the vehicle sensor data into a trained model, and generate, by the trained model, the artwork based at least in part on the vehicle sensor data.

In yet another embodiment, a computer-implement method of generating an artwork includes receiving vehicle sensor data from a vehicle, receiving external data, receiving user preferences, inputting the vehicle sensor data, external data, and user preferences into a trained model, generating, by the trained model, the artwork based at least in part on the vehicle sensor data, and generating a non-fungible token from the artwork.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe systems and methods for dynamically generating artwork based on vehicle sensor data. The artwork that is generated represents real-world vehicular activity. For example, a driver may complete one or more laps around a track and wish to generate a piece of artwork to commemorate the driving session. The systems and methods described herein receive vehicle sensor data from the driver's actual vehicle and driving session, and generates an artwork based on the driving conditions as represented by the vehicle sensor data. For example speed, acceleration and location data may be used by the embodiments described herein to generate a picture of the driver's vehicle performing on the track in accordance with the speed, acceleration and location of the vehicle while completing the driving session. The artwork may be converted into a token that may be stored and traded on a blockchain network, such as a non-fungible token.

Various embodiments of generating artwork from vehicle sensor data are described in detail below.

Figure 1A:
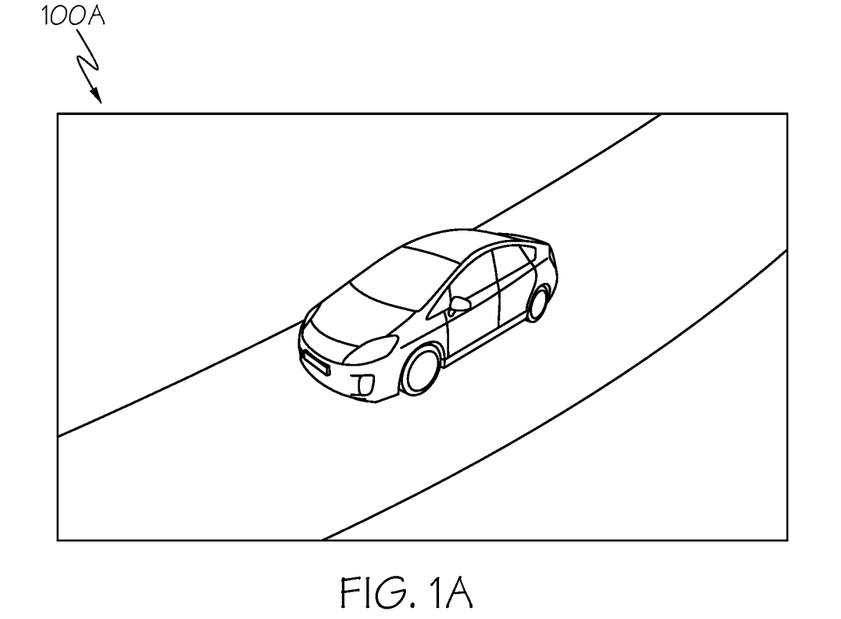
FIG. 1A schematically depicts an example generated artwork generated from vehicle sensor data according to one or more embodiments described and illustrated herein.

Referring now to FIG. 1A, an example artwork 100A automatically generated by the systems and methods described herein is illustrated. The artwork 100A is not a digital photograph of a real-world car but a computer-generated picture that depicts a car with real-world driving data. The artworks described herein are not limited to any particular type of artwork. For example, the artworks may be an image (e.g., a .jpg file, a .png file, a .pdf file, a .raw, and the like) an animated image (e.g., a .gif file and the like), or a video (e.g., a .mov file, a .mpg file, a .mp4 file, and the like).

The artwork represents actual vehicle and location characteristics of a driving session. For example, a driver may drive his or her car at a racetrack. As a non-limiting example, the artwork 100A of FIG. 1A represents a driver's car driving on Sebring International Raceway in Sebring, Florida. Location data, such as location data provided by the cars global positioning system (GPS) sensor, is used to determine the location of the car at one or more particular points in time. Thus, the track and the background of the artwork 100A is from a location at Sebring International Raceway.

As described in more detail below, the systems and methods for dynamically generating artwork may also be based on other external data. For example, weather data may also be used to generate the artwork. The artwork 100A of FIG. 1A is based on a driving session where the sun was shining, so the lighting of the artwork 100A and the sky may present a clear, sunny day.

The systems and methods described herein may also utilize user preferences when dynamically generating the artwork. For example, the user may have a certain artwork style preference (e.g., Abstract, Impressionist, Realistic, Cartoon, and the like), color preferences, depth/focus preferences, filter type (Sepia, warm, cool, and the like), perspective of the vehicle, and the like.

Figure 1B:
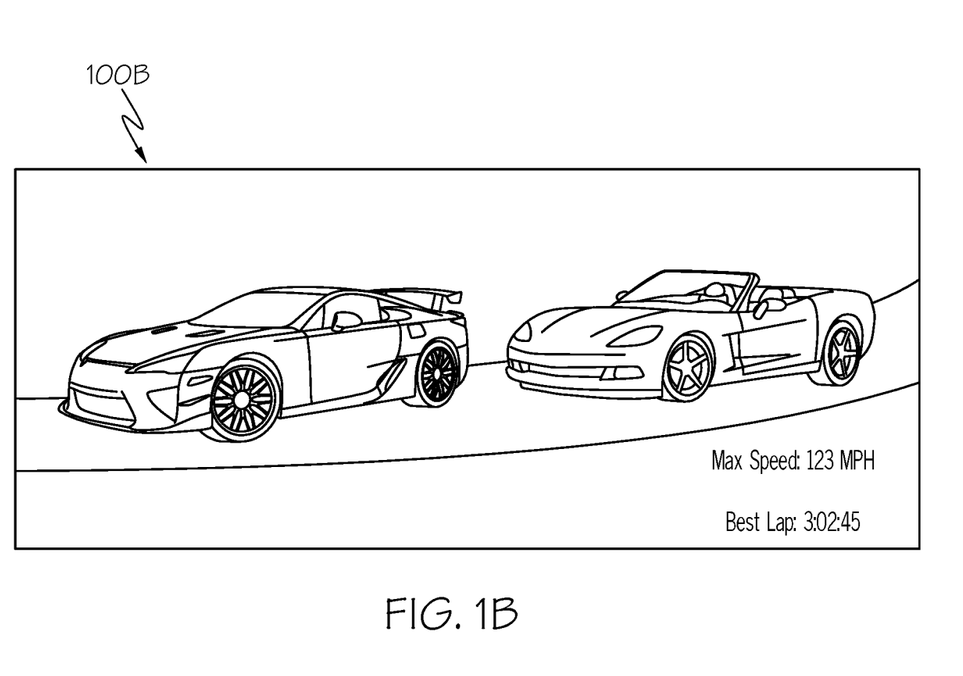
FIG. 1B schematically depicts another example generated artwork generated from vehicle sensor data according to one or more embodiments described and illustrated herein.

FIG. 1B illustrates another dynamically generated artwork 100B in the form of an image of a driver's car on another track, such as Watkins Glen International in Watkins Glen, New York. In this particular image, the car is shown with a grandstand in background. The generated artwork may also include vehicle performance attributes of the driving session, such as vehicle performance attributes (speed, acceleration, lap times, and the like), track condition attributes (e.g., temperature, precipitation, and the like). The vehicle performance attributes can be included in the artwork, and may be derived from the vehicle sensor data and/or external data.

As stated above, the artwork may also be configured as a video. For example, the system may automatically create computer generated imagery in the form of a video that illustrates the actual real world performance of the car based on vehicle sensor data and other external data. The video may be similar to video one would find in a racing video game for personal computers or gaming consoles, except in this case the video is based on a real-life driving event. The video may include different features, such as different sequential views, such as close-up views, bird's eye views, perspective views, and the like.

It should be understood that although embodiments are described in the context of automobile vehicles, embodiments are not limited thereto. Embodiments may be utilized in any type of device that has sensor data, such as boats, airplanes, motorcycles, bicycles, skateboards, four-wheelers, and the like. Further, embodiments may also be utilized in applications wherein a user wears sensors (e.g., wearable sensors), such as sports.

Figure 2:
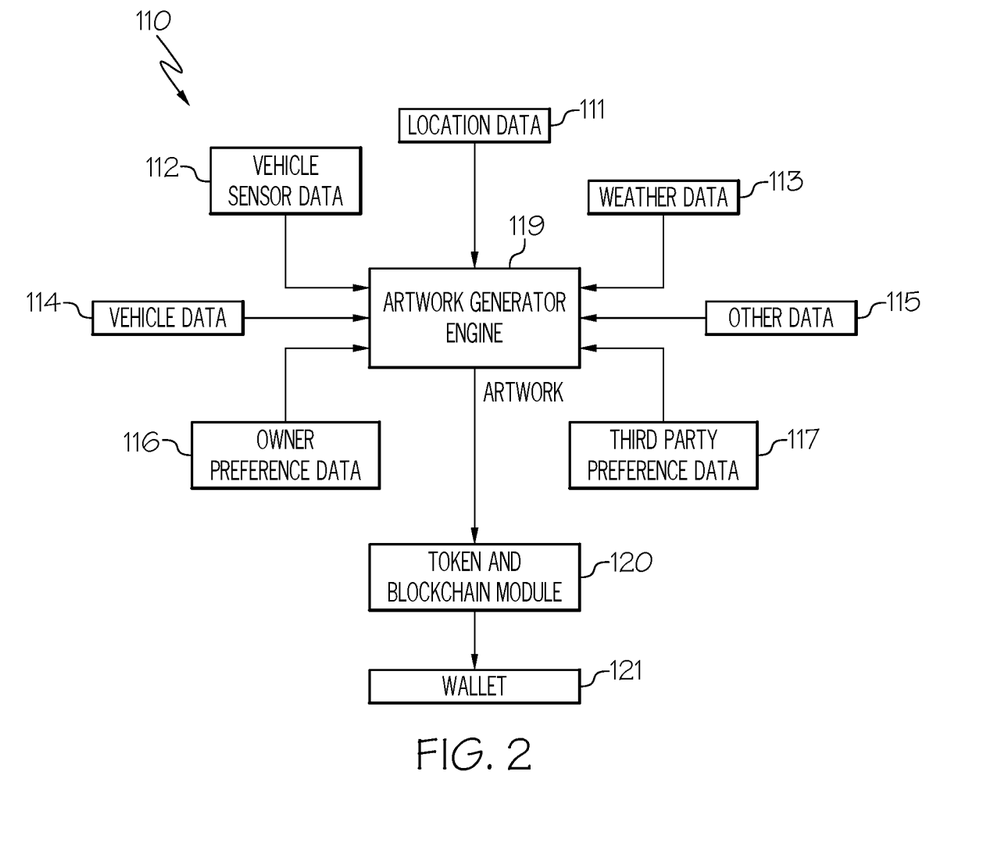
FIG. 2 depicts an example method for dynamically generating artwork from vehicle sensor data according to one or more embodiments described and illustrated herein.

Referring now to FIG. 2, a non-limiting example of a system 110 for dynamically generating artwork based on sensor data, such as vehicle sensor data, is illustrated. The system 110 includes artwork generator engine 119 that is configured to receive a plurality of inputs and generate a computer-generated artwork(s) as output. The artwork generator engine 119 may be configured as a trained model that is trained to generate the images based on the received inputs as well as training data. Embodiments of the present disclosure are not limited by the type of trained model.

Figure 3:
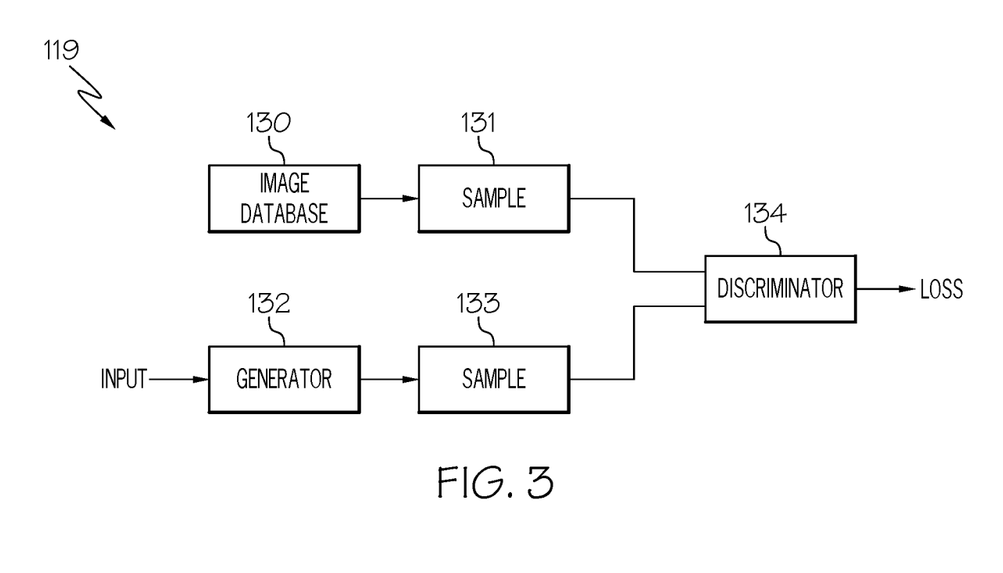
FIG. 3 depicts an example generative adversarial network for generating artwork from vehicle sensor data according to one or more embodiments described and illustrated herein.

As a non-limiting example, the artwork generator engine 119 is configured as a generative adversarial network (GAN) that is trained to create realistic images. FIG. 3 illustrates a non-limiting example GAN that may be utilized as the artwork generator engine 119. The GAN generally includes a generator 132 that is configured to generate a computer image (or video) in the form of a sample 133 based on received input. A sample image 131 is selected from an image database 130. A discriminator 134 compares the sample image 131 and the generated sample 133 and calculates a loss. The loss is back propagated and used as feedback to improve the trained model. It should be understood that the GAN of FIG. 3 is provided for illustrative purposes only, and that more or few components, of different neural networks, trained models, supervised learning methods, and the like may be used to generate the artwork described herein.

Referring once again to FIG. 2, the artwork generator engine 119 receives a plurality of inputs and produces an artwork as an output. In the example of FIG. 2, the artwork generator engine 119 receives one or more of location data 111, vehicle sensor data 112, weather data 113, vehicle data 114, other data 115, owner preference data 116, and third party preference data 117. The location data 111 may include any information relating to the particular location of the vehicle being used to generate the artwork. In high profile locations, such as famous race tracks, trails, city streets (e.g., Las Vegas Boulevard) and the like, a previously generated three-dimensional computer model may be available. Data from the three-dimensional computer model may be available to the artwork generator engine 119 to create a background for the artwork. As a non-limiting example, GPS data of the vehicle sensor data 112 indicates a location of the vehicle. This location may be referenced in the computer model of the location (e.g., a location on the track) and features at that location (e.g., grandstands, trees, buildings, and the like) may be included in the artwork that is generated. In locations where there is no computer model available, other location data 111 may be used, such as map data, images taken in the general area of the location, and the like. Any type of data may be used for the location data 111 that is provided as input to the artwork generator engine 119 and used to create a background for the artwork that is produced.

The vehicle sensor data 112 is data that is produced by the sensors located on the vehicle. In some embodiments, the vehicle sensor data 112 is read off of the communications bus, such as the vehicles controller area network (CAN) bus. Embodiments are not limited to any particular sensors. Non-limiting sensors include speedometer sensors, inertial measurement unit sensors (e.g., accelerometers, gyroscopes), cameras, pressure sensors (e.g., seat sensors), wheel sensors, lidar sensors, proximity sensors, GPS sensors, fuel sensors, charge level sensors, anti-lock brake sensors, and the like. Any data that can be produced by sensors of a vehicle may be included in the vehicle sensor data 112. As stated above, the vehicle sensor data is used by the artwork generator engine 119 to generate artwork indicative of the vehicle's performance during a driving session. It is further noted that the vehicle sensor data 112 may include instantaneous data (e.g., a speed of the vehicle at a certain time) and/or average data over a period of time (e.g., average speed over a period of time). The artwork generator engine 119 may use either or both of instantaneous and average data in generating the artwork.

Weather data 113 is a form of external data that may be used by the artwork generator engine 119 to generate the artwork. Weather data may be accessed from third party weather databases, such as one or more databases provided by the National Oceanic and Atmospheric Administration of the United States of America as a non-limiting example. Location data provided by the vehicle and temporal data (e.g., date and time) may be used to gather weather data (temperature, sun position, precipitation, sky conditions) that is used to generate the artwork. If it is a cloudy day, the resulting artwork my include a cloudy sky.

The weather data 113 may also be provided in the form of internal data that is a subset of the vehicle sensor data. 112. For example, a temperature sensor of the vehicle may detect the temperature and one or more cameras may detect precipitation and sky conditions. The artwork generator engine 119 may use one or both of internal and external weather data in generating the artwork.

The vehicle data 114 includes any information about the user's vehicle. As one example, the vehicle data 114 includes a three-dimensional model of the vehicle. As a non-limiting example, the three-dimensional model may be of a 2022 Toyota Supra. The vehicle data 114 may also include images of the vehicle. In some embodiments, a user may upload pictures of his or her physical vehicle for use by the artwork generator engine 119. Thus, the artwork generator engine 119 may use actual image data of the user's vehicle in generating the artwork. In some embodiments, the user may answer a questionnaire regarding his or her vehicle, such as the color, trim level, additional accessories, modifications, and the like. The vehicle data 114 may be used to ensure that the artwork provides a strong resemblance to the user's physical vehicle.

The owner preference data 116 includes artwork preferences of the user. A graphical user interface (which may be in the vehicle, on a website, or in a mobile application) may be used by the user to provide data regarding the type and characteristics of the artwork he or she wishes to generate. For example, the owner preference data 116 may provide if the user would like a still image or a video generated, the style of the artwork (e.g., Abstract, Figurative, Impressionist, Action Photo, and the like), color filters (e.g., Warm, Sepia, Cool, and the like), view (e.g., front, back, perspective, bird's eye, and the like). Additional user preferences may also be provided for the owner preference data 116.

Third party preference data 117 may include data regarding the preferences of other users in the community. The third party preference data 117 may indicate trends, such as a majority of users desiring a certain type of artwork or a certain filter.

Other data 115 includes any other data that may be used by the artwork generator engine 119 to produce the artwork. Other data 115 may include the image database used to generate images, information regarding different styles of artwork, filter information, and the like.

As stated above, the artwork generator engine 119 receives input data and creates one or more pieces of artwork as an output. In some embodiments, the output is a file representing the dynamic artwork, such as a .jpg file or a .png file, for example. The user may be free to share the artwork, such as by emailing it, sending it by short message service (SMS), posting it on a website, and the like. In other embodiments, the artwork may be made unique by tokenizing it into a non-fungible token (NFT) that is stored and tracked on a blockchain. In such embodiments, the unique artworks may be sold, traded or otherwise transferred to third parties. The non-fungible token may be a collector's item being that it is one-of-a-kind. As a non-limiting example, a professional race car driver who wins a prestigious race may generate an artwork based on the race using the artwork generator engine 119 and convert it into an NFT. This NFT may then be sold to an interested party. As another example, the race track may use the artwork generator engine 119 to create artwork NFTs based on the race and the vehicles involved in the race.

FIG. 2 illustrates that in some embodiments the artwork that is outputted from the artwork generator engine 119 is passed to a token and blockchain module 120 that tokenizes the artwork as an NFT and also mints the NFT on a blockchain. Embodiments are not limited to the particular blockchain, which may be the Ethereum blockchain, for example. In some embodiments, the token and blockchain module 120 is a dedicated component of the system 110. In other embodiments the token and blockchain module 120 is provided by a third party provider. In such embodiments, a user may receive the artwork and use an NFT minter service to create the NFT.

The NFT that represents the artwork may then be viewable in a wallet 122. The wallet may be a dedicated wallet provided by the system 110, or it may be third party wallet configured to display NFTs. In some embodiments, a wallet 122 is provided within a vehicle so that the NFTs may be viewed using an infotainment system of the vehicle.

Figure 4:
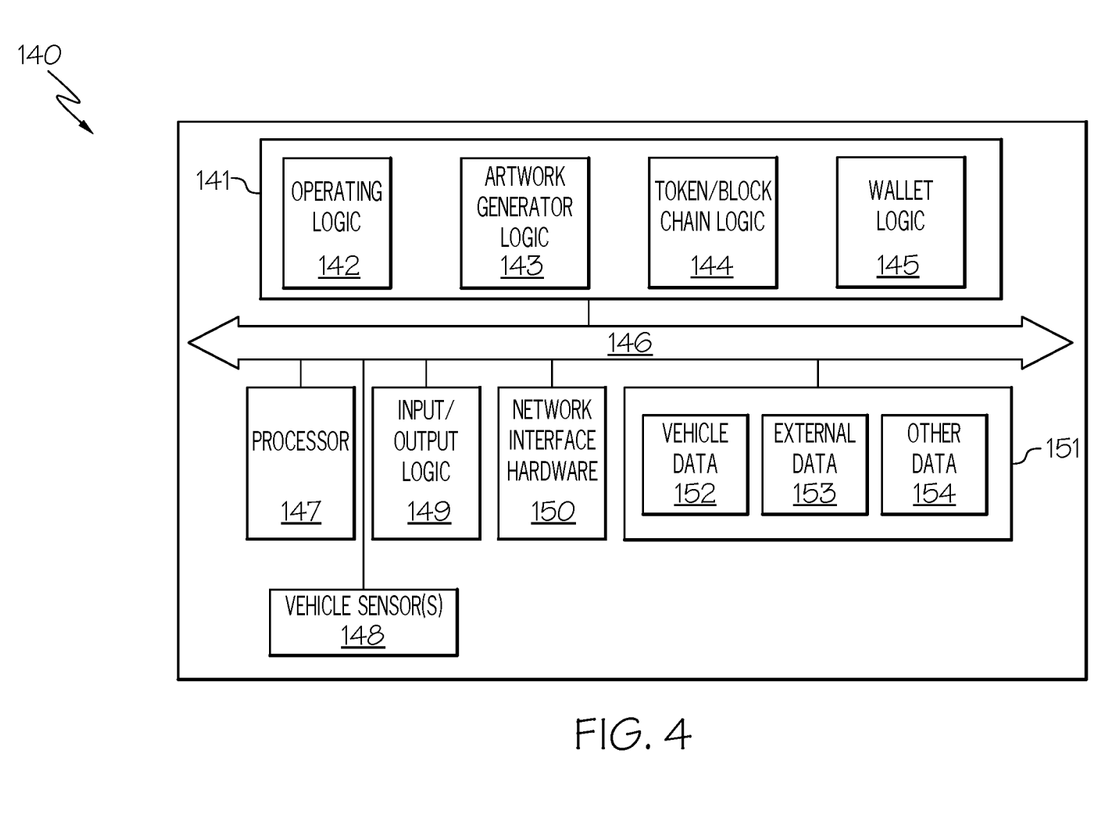
FIG. 4 depicts an example computing system for generating artwork from vehicle sensor data according to one or more embodiments described and illustrated herein.

FIG. 4 depicts an example computing system 140 for performing the functionalities as described herein. The example computing system 140 includes one or more processors 147, a communication path 146, one or more memory modules 141, one or more sensors 148, network interface hardware 150, and a data storage device 151, the details of which will be set forth in the following paragraphs. It should be understood that the computing system 140 of FIG. 4 is provided for illustrative purposes only, and that other computing systems comprising more, fewer, or different components may be utilized.

Each of the one or more processors 147 may be any device capable of executing computer readable and executable instructions. Accordingly, each of the one or more processors 147 may be a controller, an integrated circuit, a microchip, a computer, or any other computing device. The one or more processors 147 are coupled to a communication path 146 that provides signal interconnectivity between various modules of the computing system 140. Accordingly, the communication path 146 may communicatively couple any number of processors 147 with one another, and allow the modules coupled to the communication path 146 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 146 may be formed from any medium that is capable of transmitting a signal such as, for example, conductive wires, conductive traces, optical waveguides, or the like. In some embodiments, the communication path 146 may facilitate the transmission of wireless signals, such as WiFi, Bluetooth®, Near Field Communication (NFC) and the like. Moreover, the communication path 146 may be formed from a combination of mediums capable of transmitting signals. In one embodiment, the communication path 146 comprises a combination of conductive traces, conductive wires, connectors, and buses that cooperate to permit the transmission of electrical data signals to components such as processors, memories, sensors, input devices, output devices, and communication devices. Accordingly, the communication path 146 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The computing system 140 includes one or more memory modules 141 coupled to the communication path 146. The one or more memory modules 141 may comprise RAM, ROM, flash memories, hard drives, or any device capable of storing computer readable and executable instructions such that the computer readable and executable instructions can be accessed by the one or more processors 147. The computer readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer readable and executable instructions and stored on the one or more memory modules 141. Alternatively, the computer readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 141 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 141 include logic in the form of computer readable instructions that perform the functionalities described herein, such as the operating logic 142, the artwork generator logic 143, the token/blockchain logic 144, and the wallet logic 145. Additional logic used to support these functionalities may be stored in the one or more memory modules 141 and/or in remote memory modules.

The operating logic 142 may include logic for effectuating the functionalities described herein, such as an operating system and/or a graphical user interface for facilitating user input. The artwork generator logic 143 includes logic for dynamically generating artwork from vehicle sensor and other data as described herein. As a non-limiting example, the artwork generator logic 143 may include a trained model, such as a GAN. The token/blockchain logic 144, if provided, may include logic for tokenizing the artwork that is generated and also minting an NFT of the artwork in a blockchain. The wallet logic 145, if provided, includes logic for allowing a user to display the NFTs representing the dynamically generated artwork.

The data storage device 151, which may generally be a storage medium, may contain one or more data repositories for storing data that is received and/or generated, and may be any physical storage medium, including, but not limited to, a hard disk drive (HDD), memory, removable storage, and/or the like. While the data storage device 151 is depicted as a local device, it should be understood that the data storage device 151 may be a remote storage device, such as, for example, a server computing device or the like. In some embodiments, the data storage device 151 stores vehicle data 152 (e.g., data regarding features of the vehicle, such as a three-dimensional model and user-uploaded images), external data 153 (e.g., location data, weather data, and the like) and other data 154, which may include any other data used by the system to generate artwork as described herein.

Still referring to FIG. 4, the computing system 140 may comprise network interface hardware 150 for communicatively coupling the computing system 140 to a remote computing device, such as, without limitation, a remote server. The network interface hardware 150 can be communicatively coupled to the communication path 146 and can be any device capable of transmitting and/or receiving data via a network. Accordingly, the network interface hardware 150 can include a communication transceiver for sending and/or receiving wireless communications. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 150 includes hardware configured to operate in accordance with the Bluetooth® wireless communication protocol. In some embodiments, the network interface hardware 150 is configured to communicate with remote computing devices by V2I and/or vehicle-to-vehicle (V2V) communication protocols.

It should now be understood that embodiments of the present disclosure are directed to systems and methods for dynamically generating artwork. Particularly, vehicle sensor data and/or other data is provided to an artwork generator engine that dynamically produces artwork based on the vehicle sensor data and/or other data. For example, a driver may take his or her vehicle out to the track and, following the driving session, use the system to generate one or more pieces of artwork that are based on attributes of the driving session, such as the vehicle speed, handling, the location, the weather, and the like. In this manner one-of-a-kind pieces of artwork commemorating the driving session may be created. The pieces of artwork may then be tokenized as NFTs that may be minted on the blockchain. These unique NFTs may be sold, exchanged or otherwise transferred. The NFTs may become collectibles, particularly if they commemorate a popular race or driving experience.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of generating an artwork comprising:
receiving vehicle sensor data from a vehicle;
receiving user preference data;
inputting the vehicle sensor data and the user preference data into a trained model;
generating, by the trained model, the artwork based at least in part on the vehicle sensor data and the user preference data; and
generating a non-fungible token from the artwork.

2. The method of claim 1, further comprising inputting external data into the trained model, wherein the artwork is further based at least in part on the external data.

3. The method of claim 2, wherein the external data comprises at least one of location data, temporal data, weather data and race result data.

4. The method of claim 2, wherein the artwork depicts a lighting corresponding to one or more of the external data and the vehicle sensor data.

5. The method of claim 1, wherein the vehicle sensor data comprises at least one of speed data, acceleration data and camera data.

6. The method of claim 1, wherein the artwork includes one or more vehicle performance attributes derived from the vehicle sensor data.

7. The method of claim 1, further comprising applying a filter to the artwork.

8. The method of claim 1, wherein the trained model is a generative adversarial network.

9. The method of claim 1, wherein the user preference data includes an artwork style.

10. A system for generating an artwork comprising:
one or more processors:

a non-transitory computer-readable medium storing instructions that, when executed by the one or more processors, cause the one or more processors to:
receive vehicle sensor data from a vehicle; receive user preference data;
input the vehicle sensor data and the user preference data into a trained model;
generate, by the trained model, the artwork based at least in part on the vehicle sensor data and the user preference data; and
generating a non-fungible token from the artwork.

11. The system of claim 10, wherein the instructions further cause the one or more processors to input external data into the trained model, wherein the artwork is further based at least in part on the external data.

12. The system of claim 11, wherein the external data comprises at least one of location data, temporal data, weather data and race result data.

13. The system of claim 11, wherein the artwork depicts a lighting corresponding to one or more of the external data and the vehicle sensor data.

14. The system of claim 10, wherein the vehicle sensor data comprises at least one of speed data, acceleration data and camera data.

15. The system of claim 10, wherein the artwork includes one or more vehicle performance attributes derived from the vehicle sensor data.

16. The system of claim 10, wherein the instructions further cause the one or more processors to apply a filter to the artwork.

17. The system of claim 10, wherein the user preference data includes an artwork style.

18. A computer-implement method of generating an artwork comprising:
receiving vehicle sensor data from a vehicle;
receiving external data;
inputting the vehicle sensor data, external data, and user preferences into a trained model;
generating, by the trained model, the artwork based at least in part on the vehicle sensor data, wherein the artwork depicts a lighting corresponding to one or more of the external data and the vehicle sensor data; and
generating a non-fungible token from the artwork.

* * * * *